July 6, 1965   H. L. ANDERSON   3,193,680
THICKNESS MEASUREMENT USING ALPHA PARTICLES
Filed Oct. 6, 1960
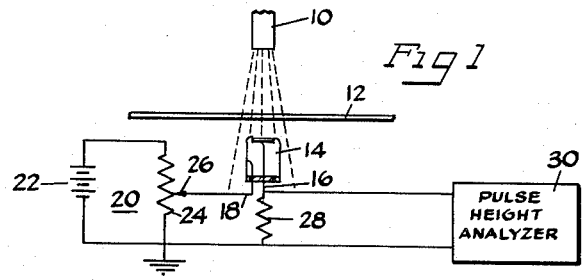
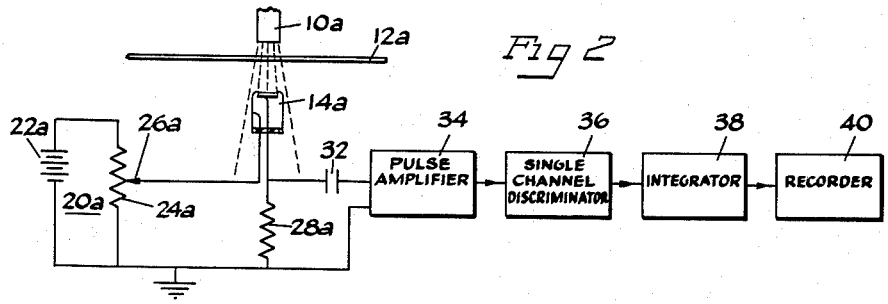
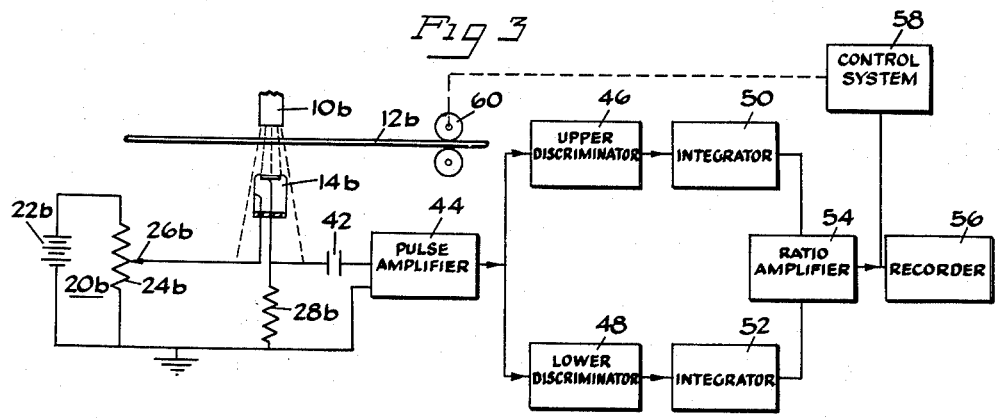
Inventor
Herbert L. Anderson
By Soans, Anderson, Luedeka & Fitch
Atty's

United States Patent Office 3,193,680
Patented July 6, 1965

3,193,680
THICKNESS MEASUREMENT USING
ALPHA PARTICLES
Herbert L. Anderson, 4923 Kimbark Ave., Chicago 15, Ill.
Filed Oct. 6, 1960, Ser. No. 60,860
2 Claims. (Cl. 250—83.3)

The present invention relates to an apparatus for determining a characteristic of substances, and more particularly, the invention relates to an apparatus which employs radiation to determine a characteristic of a substance.

Radiation has been employed in previously available testing apparatus to measure various characteristics of a substance, such as thickness, density, etc. Generally, such testing instruments have included a source of radiation which has been arranged so that the radiation therefrom is directed at the material to be measured. Depending upon the specific needs, the amount of radiation absorbed, transmitted or reflected has been measured by a detector and the resulting measurement is employed to indicate a characteristic of the substance.

In one type of previously available apparatus, for example, the thickness of a material is measured by measuring the amount of radiation transmitted through the material. Normally, in such thickness gauges, a source of beta particles has been employed, which source emits beta particles whose energy and intensity varies in a wide spectrum. As the beta particles pass through the material, their energy is reduced. Depending upon the thickness and density of the material, and the original energy of the beta particles, certain of the beta particles do not penetrate the material. The intensity of the beta particles which penetrate the material has been measured by an integrating ionization chamber, that is, an ionization chamber in which the output current is a direct measure of the rate of entry of beta particles.

The change in the output current of the ionization chamber has been employed to indicate a change in thickness of the material disposed between the source and the detector. Because only the intensity of the penetrating radiation has been measured, and this by an integrating detector, such thickness gauges have been relatively insensitive.

An object of the present invention is the provision of an improved apparatus for measuring a characteristic of a substance. Another object is the provision of an apparatus for measuring a characteristic of a substance which has a relatively high resolution and which is relatively sensitive to instantaneous changes in the characteristic. Still another object is the provision of an apparatus for measuring thickness of a material which apparatus employs a monoenergetic source. A further object is the provision of an apparatus which employs the change of energy which occurs when particles impinge upon a substance to indicate a characteristic of the substance. Still a further object is the provision of an apparatus for measuring a characteristic of a substance which is relatively simple to operate and economical to manufacture.

Other objects and advantages of the present invention will become apparent by reference to the following description and accompanying drawings.

In the drawings:

FIGURE 1 is a schematic block diagram of an apparatus for measuring a characteristic of a substance in accordance with the present invention;

FIGURE 2 is a schematic block diagram of another embodiment of an apparatus for measuring a characteristic of a substance in accordance with the present invention; and FIGURE 3 is a schematic block diagram of still another embodiment of an apparatus for measuring a characteristic of a substance.

In accordance with the present invention, an apparatus is provided for measuring a characteristic of a substance wherein a change in the energy spectrum received by a detector is employed to indicate a characteristic of the substance. Generally, the apparatus comprises a source of particles of radiation, and a particle detector spaced from said source in position to detect particles therefrom. The particle detector is responsive to the energy of particles originating at the source and passing through at least a portion of the material being measured. Means are connected to the detector to indicate the energy of the particles received by the detector.

For purposes of explanation, the apparatus will be described hereinafter in connection with the measurement of the thickness of a substance or material. However, any characteristic which can affect the energy of the particles being detected may be measured.

Specifically, the apparatus shown in FIGURE 1 includes a source 10 of particles of radiation which preferably is a monoenergetic source, that is, the particles from the source have essentially the same energy or fall into two or three groups of definite energy. Since monoenergetic sources of alpha particles are conveniently available, in the preferred embodiment of the invention, a source of alpha particles is employed, such as an isotope of polonium of atomic weight 210 ($Po^{210}$), an isotope of plutonium of atomic weight 239 ($Pu^{239}$), etc.

As shown in FIGURE 1, the source 10 of radiation is suitably supported above a material 12 to be measured, which may be paper, plastic, metal, etc. In the illustrated embodiment, the material 12 is a continuously moving sheet material which is suitably supported in spaced relationship to the source 10.

The alpha particles being emitted by the source 10 strike the material 12 and as the incident particles pass through the material they collide and interact with the atoms within the material, causing pairs of ions to form. At each such ionization the incident particle loses energy. The depth to which an alpha particle penetrates a substance depends not only upon the mass and energy of the incident particle, but also on the nature and density of the medium. If the thickness of the substance is great enough, the particle will lose all its energy and come to a stop. For purposes of this example, the material is made of a thickness such that a detectable amount or portion of the particles passes through the material.

The particles which pass through the material 12 are detected by a particle detector 14 which in the illustrated embodiment measures both the energy and the number of incident particles. Preferably, a detector 14 is provided which is fast acting and has a high resolution. One suitable detector is a semiconductor junction detector which may be made from a slab of p-type, high resistivity silicon. Phosphorus is diffused into one end of the slab for a very short distance (less than 1 micron) to form a junction therein. Suitable leads 16 and 18 are attached respectively to the slab and to the surface adjacent the junction, thereby providing a diode. Reverse bias on the diode detector 14 establishes a depletion or space charge region on both sides of the junction.

In the illustrated embodiment, the diode detector 14 is biased in the reverse direction by an adjustable direct current voltage supply 20. As illustrated the supply 20 includes a battery 22 connected in series with a potentiometer 24, the negative connection of the battery 22 being grounded. The adjustable tap 26 on the potentiometer 24 is connected to the lead 18 which is connected to the diode detector 14 adjacent the junction, and the grounded negative terminal of the battery 22 is connected through a load resistor 28 to the lead 16 which is connected to the base of the diode detector 14. Thus, by adjusting the potentiometer 24, the reverse biasing voltage applied to the detector 14 may be varied.

As illustrated in the drawing, the surface adjacent the junction in detector 14 is faced toward the incoming particles from the source 10. Each particle entering the depletion region creates a current pulse in the load resistor 28 which is proportional to the energy of the particle. As the bias voltage is increased, the magnitude for a given energy of incoming particles is increased. To obtain a linear relationship between the output of the detector 14 and the energy of the incoming particles, the bias voltage on the detector 14 is of sufficient magnitude to make the depletion region within the detector 14 of a thickness greater than the incoming particle range.

The voltage developed across the load resistor 28 for an incident particle is a pulse, the amplitude of which is proportional to the energy of the incident particle. As shown in FIGURE 1, the voltage pulse developed across the load resistor 28 is coupled to a means 30 for indicating the energy spectrum or distribution of the incident particles, such as a pulse height analyzer.

When there is no material disposed between the source 10 and detector 14, the incident particles have a certain energy distribution. However, when a material is disposed between the source 10 and detector 14, the particles traversing the material lose a certain portion of their energy, resulting in smaller pulses being received by the indicating means 30. Consequently, there is a downward shift in the energy distribution. The peak energy of the particles, for example, is now indicated in a lower channel of the indicating device. From this shift in energy distribution the variation in thickness of material may be determined.

It should be noted that the measurement is dependent upon a change in the energy of the particles and not upon a change in the number of particles traversing the material. The intensity may change somewhat but, when employing alpha particles the change is minor for a small change in thickness. On the other hand, the shift in the energy level is easily observed or measured. The peak energy, the average energy or the maximum energy may be observed or measured.

If desired a standard thickness of material may be disposed between the detector 14 and source 10 to provide a normal or standard energy level and then an upward or downward shift of the energy level will indicate a corresponding variation of the material from normal or standard.

It should be realized that while the intensity of a source decreases with time the energy of the particles emitted by the source remains constant. Thus, recalibration for change in the intensity of the source is not necessary.

FIGURES 2 and 3 schematically show various circuit arrangements that may be employed to conveniently measure the departure of a continuous moving strip of material from a normal or standard thickness. Generally, the circuit arrangements provide an output signal which is indicative of the amount of shift in the energy spectrum from normal.

In FIGURE 2, wherein similar parts to those shown in FIGURE 1 are indicated by the same reference numeral with the subscript "a," the output from the detector 14a developed across the load resistor 28a is fed through a coupling capacitor 32 to the input of a pulse amplifier 34, which may be of the conventional type. The output from the pulse amplifier 34 is connected to a single channel discriminator 36 which transmits pulses having amplitudes which fall within certain limits.

In the embodiment illustrated in FIGURE 2, the output from the single channel discriminator 36 is coupled to an integrator circuit 38 of the conventional type which provides a time-integrated average of the pulses applied thereto. The ouput of the integrator 38 is connected to a suitable recorder 40.

In operation, the single channel discriminator 36 is adjusted to pass a band of pulses having amplitudes corresponding to the maximum energy level of the alpha particles incident on the detector 14a with the standard or normal thickness of material disposed between the detector 14a and source 10a. If the material being measured increases in thickness, the energy level will be shifted downwardly, thus providing a reduced output from the integrator 38 and a lower reading on the recorder 40.

In the embodiment shown in FIGURE 2, the number of particles having a given energy level is measured. Hence, any decrease in the source affects the calibration of the device, and the device is recalibrated to compensate for a change in intensity. However, since the energy of the particles emitted by the source remains constant, frequent recalibration is not necessary.

In the circuit shown in FIGURE 3, wherein similar parts to those in FIGURE 1 are indicated by the same reference numeral with the subscript "b," the output across the load resistor 28b is coupled through a coupling capacitor 42 to the input of a conventional pulse amplifier 44, which amplifies the pulses sufficiently to operate subsequent circuit components. The output from the pulse amplifier 44 is coupled to the inputs of a pair of single channel discriminators 46 and 48.

The discriminators 46 and 48 are adjusted so that one of the discriminators 46 hereinafter referred to as the upper discriminator, passes pulse amplitudes which fall within a channel having a predetermined limit. The other discriminator 48, hereinafter referred to as the lower discriminator, passes pulses which fall within a channel below the upper channel. The output from the upper and lower discriminators 46 and 48 are fed respectively to conventional integrators 50 and 52 which determine the number of pulses in the respective chanels per unit time. The outputs from the integrators 50 and 52 are fed to the input of a common ratio amplifier 54 of the conventional type wherein the outputs from the integrators 50 and 52 are compared to provide an output signal representative of the ratio therebetween. The output from the ratio amplifier 54, in turn, is fed to a recorder 56, whereby the output signal is recorded.

As shown in FIGURE 3, the output signal from the ratio amplifier is also fed to a conventional control system which controls a means 60 for suitably changing the thickness of the material 12b being measured. Thus, a feedback control system is provided whereby the thickness of the material 12b is maintained constant.

In operation, the bias on the detector 14b is adjusted to obtain a maximum output therefrom at a minimum thickness of material between the detector 14b and the source 10b. With the standard thickness of material between the source 10b and detector 14b the upper limit of the lower discriminator 48 and the lower limit of the upper discriminator 46 are adjusted to a pulse height which is approximately equal to the maximum pulse height of the energy spectrum and which provides a zero output from the ratio amplifier 54.

Variation of the thickness of the material from the standard provides an output signal from the ratio amplifier 54. For example, if the thickness of the material increases, the energy distribution is shifted downwardly and hence the number of pulses per unit time in the upper channel is reduced and the number of pulses per unit time in the lower channel is increased thereby providing an output at the ratio amplifier 54. The magnitude and sign of the output signal from the ratio amplifier 54 depends upon the change of thickness of the material.

Since the output signal from the ratio amplifier depends only on the ratio of the number of particles in one channel to the number of particles in a second channel variation in the intensity of the source particles proportionately affects each channel. Therefore, the output signal is not affected and recalibration for a decrease in intensity is not required.

The above described apparatus for measuring thickness is very sensitive to a minute change in thickness of the material being measured. For example, if the detector and a $Pu^{239}$ source of alpha particle (5.15 mev.) are closely spaced on opposite sides of a mylar film (1.72 mg./cm.$^2$) having a thickness of 0.005 inch, the energy of the alpha particles is reduced to about 3.6 mev. The pulse height at the output of the detector is then reduced approximately in the ratio of the two energies, that is, to about 65 percent of its value without the film. The number of pulses in the channel in which the maximum number of alpha particles are being counted, falls to about one-half of its value if the thickness of the film is increased or decreased by about 0.007 mg./cm.$^2$, that is, about 0.4 percent. A conventional indicating device can conveniently detect changes of about one-tenth of this number of pulses.

While it is preferable because of the monoenergetic properties of alpha particle sources to employ such sources in this invention, the penetrating power of alpha particles limits the maximum thickness that can be measured by such a device to a relatively small value. For example, a film of mylar thicker than about 0.002 inch normally cannot be measured. For material with a greater thickness a source of beta particles may be employed.

Beta particles have a smaller mass than alpha particles, and hence, have a higher penetrating power. However, the energy spectrum for beta particle sources is more broadly distributed than alpha particles and the effects of scattering the straggling are considerably greater. For these reasons, the sensitivity of the device is appreciably reduced, but the sensitivity is still greater than previously available radiation measuring devices. A beta source such as radioactive phosphorus may be used.

Because of the higher penetrating power of beta particles, it may not be convenient to provide a semiconductor which is suitable to measure the energy and intensity of the beta particles. A pair of semi-conductor detectors, which are spaced apart and connected to a coincidence circuit, may be employed. The detectors are disposed in aligned relationship with an absorber therebetween so that beta particles penetrate both detectors. The absorber is chosen to select the desired particle energy. Also other detectors may be employed, such as scintillation detectors, etc. Similar circuits to those described above in connection with an alpha particle source may be employed with a beta particle source.

As previously indicated, sources in which the particles emitted have energies within a narrow band provide the preferred operation. Besides alpha particle sources, other sources such as $Cs^{137}$ may be employed. $Cs^{137}$ provides internally converted electrons in a narrow energy band which have a greater penetrating power than alpha particles from radioactive substances.

While the apparatus is described above in connection with an apparatus for measuring the thickness of material, it should be realized that other characteristics of a material may be measured by employing the principles of the present invention. For example, the principles of the invention may be employed to measure the change in density of material having a constant thickness.

Also a very sensitive vacuum gauge may be provided by employing the principles of this invention. In this connection the detector is arranged to measure the particles passing through the gas, the energy level indicating the gas pressure.

From the above, it can be seen that by the present invention an improved apparatus is provided for measuring a characteristic of a substance. The apparatus is very sensitive and can measure a very small variation in the measured characteristic of the material.

Various changes and modifications may be made in the above described measuring apparatus without departing from the spirit or scope of the present invention. Various features of the invention are set forth in the accompanying claims.

What is claimed is:
1. A method of measuring the thickness of a substance, comprising passing alpha particles through a substance to be measured, detecting the energy spectrum of the alpha particles passing through the substance, and employing any shift in the energy spectrum of the alpha particles to indicate the thickness of the substance.

2. An apparatus for measuring the thickness of a substance, comprising a source of alpha particles, a semiconductor junction diode detector spaced from said source and responsive to alpha particles emitted by said source, alpha particles producing pulses at the output of said detector having magnitudes which are representative of the energy of the particles, means for positioning a substance to be measured between said source and said detector, first means connected to said detector for selectively transmitting pulses therefrom having magnitudes which occur in a predetermined range of values, second means connected to said detector for transmitting pulses having magnitudes which occur in a second predetermined range of values, means connected respectively to said first and said second means for integrating the pulses therefrom, and means connected to the outputs of said integrating means for comparing the outputs therefrom and providing a signal which represents the ratio between the outputs of said integrating means, said predetermined ranges being set so that an equal number of pulses are transmitted by the first and the second transmitting means when a standard thickness is disposed between the source and the detector.

References Cited by the Examiner

UNITED STATES PATENTS

| | | | |
|---|---|---|---|
| 2,605,332 | 7/52 | Parsons | 250—83.3 |
| 2,648,012 | 8/53 | Scherbatskoy | 250—83.3 |
| 2,653,247 | 9/53 | Lundahl | 250—83.4 |
| 2,778,949 | 1/57 | Borowski et al. | 250—83.3 |
| 2,816,234 | 12/57 | Ellis | 250—83.3 |
| 2,861,189 | 11/58 | Bernstein | 250—83.4 |
| 2,897,371 | 7/59 | Hasler | 250—83.4 |
| 2,903,590 | 9/59 | Somerville | 250—83.4 |
| 2,939,012 | 5/60 | Scherbatskoy | 250—83.4 |
| 2,947,871 | 8/60 | Friedman | 250—83.4 |
| 2,957,081 | 10/60 | Chapman | 250—83.4 |
| 2,971,429 | 2/61 | Howerton | 250—83 |
| 2,989,637 | 6/61 | Scherbatskoy | 250—83.3 |
| 2,990,475 | 6/61 | Scherbatskoy | 250—71.5 |
| 3,012,140 | 12/61 | Pellissier et al. | 250—71.5 |
| 3,043,955 | 7/62 | Friedland et al. | 250—83.3 |
| 3,046,402 | 7/62 | Cherry | 250—83.4 |
| 3,105,149 | 9/63 | Guitton et al. | 250—83.3 |

FOREIGN PATENTS

| | | |
|---|---|---|
| 603,016 | 8/60 | Canada. |

RALPH G. NILSON, *Primary Examiner.*

ARTHUR GAUSS, *Examiner.*